US012612930B2

(12) United States Patent
Wang et al.

(10) Patent No.: US 12,612,930 B2
(45) Date of Patent: Apr. 28, 2026

(54) HYDRAULIC SYSTEM MICRO-ADJUSTMENT DEVICE, AND TANK CALIBRATION SYSTEM COMPRISING THE SAME

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Bingzheng Wang, Changzhou (CN); Chunhui Li, Changzhou (CN); Chenggang Ding, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 35 days.

(21) Appl. No.: 18/725,719

(22) PCT Filed: Dec. 27, 2022

(86) PCT No.: PCT/CN2022/142425
§ 371 (c)(1),
(2) Date: Jun. 28, 2024

(87) PCT Pub. No.: WO2023/125555
PCT Pub. Date: Jul. 6, 2023

(65) Prior Publication Data
US 2025/0172162 A1 May 29, 2025

(30) Foreign Application Priority Data

Dec. 29, 2021 (CN) ......................... 202111636658.8

(51) Int. Cl.
*F16K 1/36* (2006.01)
*F15B 13/02* (2006.01)
(Continued)

(52) U.S. Cl.
CPC ................ *F15B 13/02* (2013.01); *F16K 1/02* (2013.01); *F16K 1/36* (2013.01); *F16K 31/60* (2013.01)

(58) Field of Classification Search
CPC ... F16K 1/36; F16K 31/60; F16K 1/02; F16K 31/122; F15B 13/02
See application file for complete search history.

(56) References Cited

U.S. PATENT DOCUMENTS 1,974,296 A * 9/1934 Ball ................... G05D 16/0404
251/86
2,717,142 A 9/1955 Murray
(Continued)

FOREIGN PATENT DOCUMENTS

CN 105626617 A 6/2016
CN 105090140 B 6/2018
(Continued)

*Primary Examiner* — Marina A Tietjen
(74) *Attorney, Agent, or Firm* — Standley Law Group LLP; Jeffrey S. Standley; Adam J. Smith

(57) ABSTRACT

A hydraulic system micro-adjustment device and a tank calibration system including same are disclosed. The device includes a base, a piston, valve body, valve core, and handle. The valve body includes an inner cavity for receiving the valve core from an upper portion of the valve body, the valve core being in threaded connection with the inner cavity. The piston is inserted into the inner cavity from a lower portion of the valve body and abuts the valve core. The lower (Continued)

portion of the valve body is mounted in the base and is in communication with oil passages therein. The handle is connected to a top of the valve core, which is movable along the inner cavity upon rotation of the handle thereby pushing the piston along the inner cavity so as to change the volume of a cavity formed by the base, the valve body, and the piston.

12 Claims, 7 Drawing Sheets

(51) Int. Cl.
 *F16K 1/02* (2006.01)
 *F16K 31/60* (2006.01)

(56) References Cited

U.S. PATENT DOCUMENTS

| | | | | |
|---|---|---|---|---|
| 4,281,729 | A | 8/1981 | Farley et al. | |
| 4,687,181 | A * | 8/1987 | Simonelli | F16K 1/523 |
| | | | | 251/223 |
| 5,127,483 | A | 7/1992 | Hough | |
| 5,351,936 | A * | 10/1994 | Tanikawa | F16K 41/10 |
| | | | | 251/278 |
| 5,439,197 | A | 8/1995 | Itoi et al. | |
| 5,725,198 | A * | 3/1998 | Jandl | F16K 31/50 |
| | | | | 251/903 |
| 5,937,645 | A | 8/1999 | Hamamoto | |
| 6,627,825 | B1 | 9/2003 | Creswick | |
| 7,134,638 | B2 * | 11/2006 | Kamiya | F16K 1/302 |
| | | | | 251/83 |
| 8,104,742 | B2 * | 1/2012 | Ishihara | F16K 31/50 |
| | | | | 251/297 |
| 2012/0132840 | A1 | 5/2012 | Shuman et al. | |
| 2017/0356789 | A1 | 12/2017 | Sutariya | |
| 2019/0113383 | A1 | 4/2019 | Sanhaji | |
| 2020/0018633 | A1 | 1/2020 | Larsen et al. | |
| 2020/0378409 | A1 | 12/2020 | Bruck et al. | |
| 2021/0239514 | A1 | 8/2021 | Zhang et al. | |
| 2022/0090697 | A1 | 3/2022 | Wang et al. | |

FOREIGN PATENT DOCUMENTS

| | | | |
|---|---|---|---|
| CN | 208057538 | U | 11/2018 |
| CN | 109060084 | A | 12/2018 |
| CN | 208672132 | U | 3/2019 |
| CN | 211262461 | U | 8/2020 |
| EP | 3255395 | B1 | 9/2020 |
| EP | 4060297 | A1 | 9/2022 |
| GB | 699296 | A | 11/1953 |

* cited by examiner

60

HYDRAULIC SYSTEM MICRO-ADJUSTMENT DEVICE, AND TANK CALIBRATION SYSTEM COMPRISING THE SAME

BACKGROUND OF THE INVENTION

Technical Field

The present invention relates to the field of tank calibration systems, and in particular to a hydraulic system micro-adjustment device and a tank calibration system comprising the same.

Background Art

In the prior art, calibration of weighing systems for large and medium-sized tanks is a difficult problem that has troubled users for many years. It is well known that calibration with weights is widely recognized as the most accurate calibration method that is acknowledged metrologically, but the calibration with weights is extremely difficult to operate in practical applications.

However, many existing tanks have a weight ranging from a few tons to hundreds of tons, there is no place on the tank where weights can be hung, and carrying weights is time-consuming and laborious. So, it is almost impossible to calibrate these weighing systems with sufficiently heavy pure weights. Thereafter, material substitution, material transfer and other methods are also conceived, but these methods are not only time-consuming and laborious, but also expensive and inaccurate.

For example, the patent CN 208672132 U proposes a new calibration method for a tank weighing system. In this method, a calibration operation can be performed by means of temporarily fitting, on a tank, a hydraulic calibration system which mainly comprises a calibration module, a calibration instrument and a manual pump. During calibration, the stability of hydraulic pressure has a great influence on the calibration accuracy. Generally, such methods are implemented with a hydraulic control valve or an electric hydraulic pump. However, for a hydraulic calibration system for a tank, the use of an electric hydraulic pump has great requirements on the convenience, cost, power supply form, etc. of the entire product, and is thus not suitable for frequent and multi-site switching field applications.

At present, the existing hydraulic control valves on the market are usually directly used to control the flow velocity of hydraulic oil, and the flow velocity is controlled by means of controlling the size of an oil passage opening in a valve body. Since the movement of adjustable parts in the valve body has little influence on the volume of the entire hydraulic system, it is impossible to implement adjustment in a local range by means of an existing hydraulic valve during adjustment, especially in a high-pressure system.

In an oil passage system, the hydraulic oil is incompressible by default, and the expansion and contraction of a pipeline is negligible. In a weighing calibration hydraulic system, for an existing valve, after a stable oil pressure is achieved, the oil pressure can only be reduced by means of opening the valve. If the speed of pressure reduction is too fast, it is impossible to implement accurate control and increase the pressure in the system by means of the valve, so that it is necessary to increase the volume of hydraulic oil by means of an external hydraulic pump so as to increase the pressure.

In addition, by means of controlling the internal volume of an oil pressure system, with the design of the adjustable volume of the valve body being proportional to the inner cavity of the valve body, the function of providing adjustable pressure within a local pressure range of the hydraulic system can be achieved.

In view of this, the inventor of the present application has designed a hydraulic system micro-adjustment device and a tank calibration system comprising same, in order to overcome the technical problem mentioned above.

SUMMARY

The technical problem to be solved by the present invention is to provide a hydraulic system micro-adjustment device and a tank calibration system comprising same, in order to overcome the defects in the prior art that the oil pressure in a hydraulic system cannot be accurately controlled and the pressure in the system cannot be increased by means of a valve, etc.

According to the present invention, the above technical problem is solved by the following technical solution:

A hydraulic system micro-adjustment device, comprising a base, a piston, a valve body, a valve core and a handle, characterized in that the valve body is internally provided with an inner cavity, for receiving the valve core from an upper portion of the valve body; wherein the valve core is in threaded connection with the inner cavity; the piston is inserted into the inner cavity from a lower portion of the valve body, the piston abuts against the valve core; the lower portion of the valve body is mounted in the base and is in communication with oil passages in the base, and the handle is connected to a top of the valve core; and the valve core is movable along the inner cavity upon rotation of the handle thereby pushing the piston to move along the inner cavity, so as to change volume of a cavity formed by the base, the valve body and the piston.

According to an embodiment of the present invention, an upper portion of the base is provided with a mounting hole, two side portions of the base are respectively provided with an oil passage which are in communication with the mounting hole, and the lower portion of the valve body is mounted in the mounting hole.

According to an embodiment of the present invention, the volume of the cavity formed by the base, the valve body and the piston is a first volume when the valve core is screwed to reach a highest point, and the volume of the cavity formed by the base, the valve body and the piston is a second volume when the valve core is screwed to reach a lowest point, the first volume being twice the second volume.

According to an embodiment of the present invention, an upper portion of the inner cavity of the valve body is provided with threads, and a middle portion of the valve core is provided with threads, such that the valve core is in threaded connection with the upper portion of the inner cavity; and a lower portion of the inner cavity is a through hole, in which the piston is inserted.

According to an embodiment of the present invention, a bottom of the valve core has a circular arc structure, with a radius of the circular arc structure being a distance from a central point of the threads of the valve core to the bottom of the valve core.

According to an embodiment of the present invention, a lower portion of the valve core is a polished rod.

According to an embodiment of the present invention, an upper portion of the valve core is provided with a circular ring that indicates position of the valve core.

According to an embodiment of the present invention, a surface of the piston is provided with a first groove, in which a sealing ring and a sealing ring stop collar are mounted.

According to an embodiment of the present invention, the surface of the piston is provided with a guide groove, in which a guide ring is mounted.

According to an embodiment of the present invention, the guide ring is made of a polymer material.

According to an embodiment of the present invention, a bottom of the piston is configured as a needle-shaped structure.

According to an embodiment of the present invention, the valve body, the base, the piston and the valve core are made of nickel-base alloy stainless steel.

According to an embodiment of the present invention, the hydraulic system micro-adjustment device further comprises a top cover, that is sleeved over the upper portion of the valve core and is connected and fixed to an upper end portion of the valve body.

The present invention further provides a tank calibration system, characterized in that the tank calibration system comprises the hydraulic system micro-adjustment device as described above.

The present invention has the positive and progressive effects as follows.

With the hydraulic system micro-adjustment device and the tank calibration system comprising same according to the present invention, the adjustment of pressure in a local range can be achieved, thereby reducing the number of times of pressurization to improve the calibration efficiency. The target pressure value can be reached quickly and stably, thereby reducing uncertainty and improving the calibration accuracy.

In terms of function, the hydraulic system micro-adjustment device implements pressure adjustment by means of the cooperation of the base, the piston, the valve core and the valve body.

In terms of machinability, the components of the hydraulic system micro-adjustment device have a simple structure and are convenient to machine, and most of the components are cylindrical and can be machined by means of lathe work.

In terms of serviceability, the hydraulic system micro-adjustment device can be replaced with a polymer sealing member.

In terms of reliability, with the structure of the hydraulic system micro-adjustment device, the piston is evenly stressed, thus preventing the damage to a moving face of the piston. The combination of different grades of stainless steel eliminates the bonding between the valve body and the base and between the valve core and the valve body, thus providing high fatigue life.

BRIEF DESCRIPTION OF THE DRAWINGS

The above and other features, properties and advantages of the present invention will become more apparent from the following description in view of the accompanying drawings and embodiments, and the same reference numerals denote the same features throughout the accompanying drawings, in which.

BRIEF DESCRIPTION OF THE DRAWINGS

Figure 1:
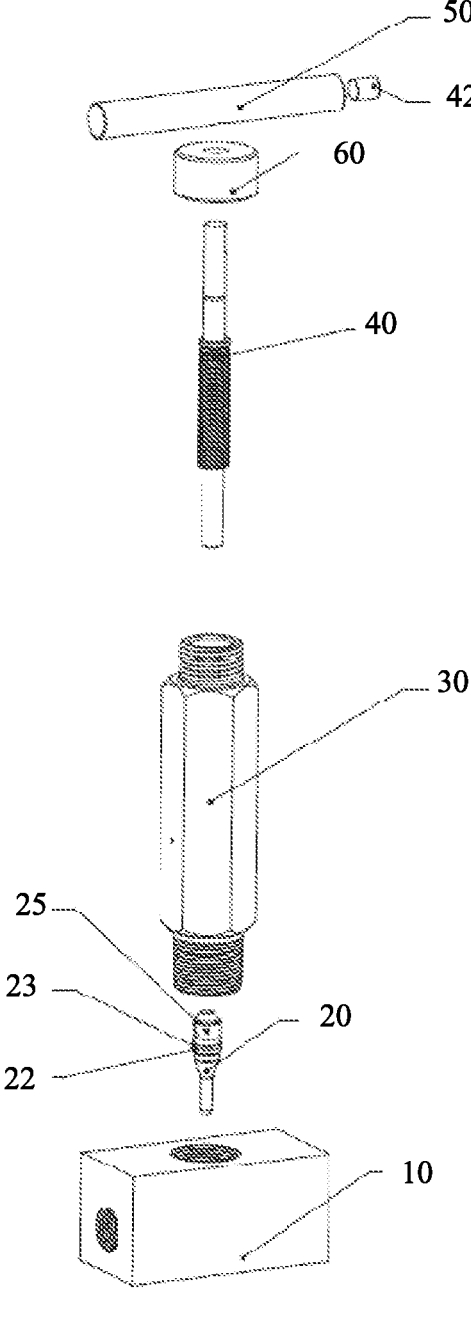
FIG. 1 is a schematic exploded diagram of a hydraulic system micro-adjustment device according to the present invention
Figure 2:
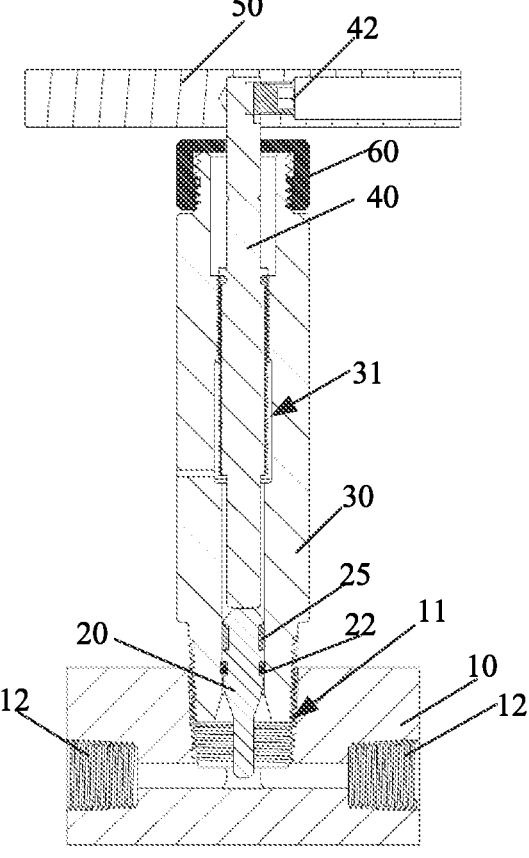
FIG. 2 is a longitudinal cross-sectional view of the hydraulic system micro-adjustment device according to the present invention after assembled.

In order to make the above objectives, features and advantages of the present invention more apparent and easier to understand, the detailed description of embodiments of the present invention will be described in detail below in view of the accompanying drawings.

The embodiments of the present invention will now be described in detail with reference to the accompanying drawings. Reference will now be made in detail to preferred embodiments of the present invention, examples of which are illustrated in the accompanying drawings. The same reference numerals will be used throughout the accompanying drawings to denote the same or similar parts wherever possible.

Furthermore, although the terms used in the present invention are selected from well-known and common terms, some of the terms mentioned in the specification of the present invention may be chosen by the applicant according to his or her determination, and the detailed meanings thereof are described in the relevant section described herein.

Furthermore, the present invention must be understood, not simply by the actual terms used but also by the meanings encompassed by each term.

As shown in FIGS. 1 to 10, the present invention discloses a hydraulic system micro-adjustment device, comprising a base 10, a piston 20, a valve body 30, a valve core 40 and a handle 50. The valve body 30 is internally provided with an inner cavity 31 for receiving the valve core 40 from an upper portion of the valve body 30, wherein the valve core 40 is in threaded connection with the inner cavity 31. The piston 20 is inserted into the inner cavity 31 from a lower portion of the valve body 30, the piston 20 abuts against the valve core 40, the lower portion of the valve body 30 is mounted in the base 10 and is in communication with oil passages 12 in the base 10, and the handle 50 is connected to the top of the valve core 40. The valve core 40 is movable along the inner cavity 31 upon rotation of the handle 50 thereby pushing the piston 20 to move along the inner cavity 31, so as to change volume of a cavity formed by the base 10, the valve body 30 and the piston 20.

Such a structure is different from a structure of a conventional valve in which a valve core is in direct contact with hydraulic oil. In the present application, the piston 20 and the valve core 40 are separated as two parts. Such a design can prevent the occurrence of rotary movement when the valve core 40 is rotated to push the piston 20, and only linear movement occurs. In this way, the friction between a sealing ring (e.g., an O-ring) on the piston 20 and the valve body 30 can be reduced, thereby prolonging the service life of the sealing member.

In addition, the hydraulic system micro-adjustment device further comprises a top cover 60, and the top cover 60 is sleeved over the upper portion of the valve core 40 and is connected and fixed to an upper end portion of the valve body 30.

Preferably, an upper portion of the base 10 is provided with a mounting hole 11, two side portions are respectively provided with an oil passage 12, the oil passages 12 are in communication with the mounting hole 11, and the lower portion of the valve body 30 is mounted in the mounting hole 11. The oil passages 12 are mainly configured to be connected to an external oil pipe, and threaded connection may be used between the mounting hole 11 and the valve body 30. The outline of the valve body 30 is designed to be hexagonal, which can facilitate tightening of the valve body 30 when mounted on the base 10, the bottom of the valve body is connected to the base 10 by means of pipe threads, and the top of the valve body is connected to the top cover 60 by means of metric threads.

The volume of the cavity formed by the base 10, the valve body 30 and the piston 20 is a first volume when the valve core 40 is screwed to reach a highest point, and the volume of the cavity formed by the base 10, the valve body 30 and the piston 20 is a second volume when the valve core 40 is screwed to reach a lowest point, the first volume being twice the second volume. With such a volume relationship, stable adjustment of the range can be achieved within a certain range under high pressure. The change in volume of the cavity formed by the base 10, the valve body 30 and the piston 20 is greater than the volume of hydraulic oil delivered by a hydraulic oil pump at a time, which can ensure that the required adjustment range can be greater than that achieved by one pressurization, and all pressure points can be reached by cooperating with an existing hydraulic pump.

Under the action of a hydraulic calibration weighing device, the oil pressure is usually a high pressure greater than 50 Mpa, at which the piston 20 will be pushed against the valve core 40, so that the piston 20 and the valve core 40 will bear high pressure. In order to achieve accurate adjustment of the pressure within a certain force range, the distance by which the piston 20 moves up and down is much greater than the diameter of the piston 20. Therefore, according to the present invention, through the design of structure and material, the hydraulic system micro-adjustment device that is reliable and has long service life is realized.

Preferably, an upper portion of the inner cavity 31 of the valve body 30 is provided with threads (e.g., fine threads), and a middle portion of the valve core 40 is provided with threads (e.g., fine threads), so that the valve core 40 is in threaded connection with the upper portion of the inner cavity 31, and the vertical movement of the valve core 40 is accurately controlled through the cooperation with the valve core 40. A lower portion of the inner cavity 31 is a through hole with extremely low surface roughness. The piston 20 is received in the through hole, and the piston 20 can slide up and down in this space.

The top of the valve core 40 is milled to form a flat face 41 and can be fixed to the handle 50 by means of a set screw 42. An upper portion of the valve core 40 is preferably provided with a circular ring 43 for indicating the position of the valve core 40. In an operating state, when the circular ring 43 is just exposed from the top cover 60, while the valve core 40 is in a middle position, the valve core 40 can move up or down by the same distance.

Particularly, the bottom of the valve core 40 preferably has a circular arc structure herein, and the radius of the circular arc structure is preferably equal to the distance A from a central point of the threads of the valve core 40 to the bottom of the valve core 40. A lower portion of the valve core 40 is preferably a polished rod.

Such a circular arc structure can ensure that the contact point of the valve core 40 with the piston 20 is kept in the center of the piston 20, which can ensure that the force will always be transmitted to the piston 20 in a vertical direction, reducing the rotational torque received by the piston 20 when the valve core 40 rotates, thus, reducing the circumferential force applied to the piston 20 by the movement of the valve core 40. Since, the force always acts on the central point of the piston, the radial force caused by the rotation of the valve core 40 can be reduced, and the reduction of the circumferential force and the radial force can prevent excessive wear on one side of a vulnerable part of the piston 20.

More specifically, due to the thread fit, the axis of the valve core 40 cannot be guaranteed to be at the center of a piston contact face during the rotation, and the axis of the valve core 40 is slightly inclined. Assuming that the bottom of the valve core is a cone, when the valve core is rotated, the tip of the cone will draw a circle on the surface of the piston 20, so that the force is not transmitted through the center of the piston, and a lateral force will be generated. In this way, in the present application, the bottom contact face of the piston 20 is designed as a circular arc structure. Since, the valve body 30 is in threaded connection with the valve core 40, assuming that the connection point is at the center of the valve core 40, the valve core 40 swings around the connection point. In the present application, the round corner design can ensure that the contact point of the valve core 40 with the piston 20 is always on the axis, so that the force can always be at the center.

Figure 3:
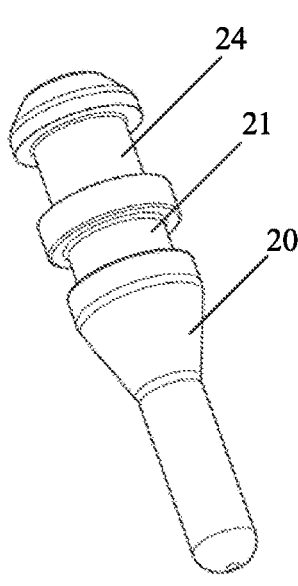
FIG. 3 is a schematic structural diagram of a piston in the hydraulic system micro-adjustment device according to the present invention.
Figure 4:
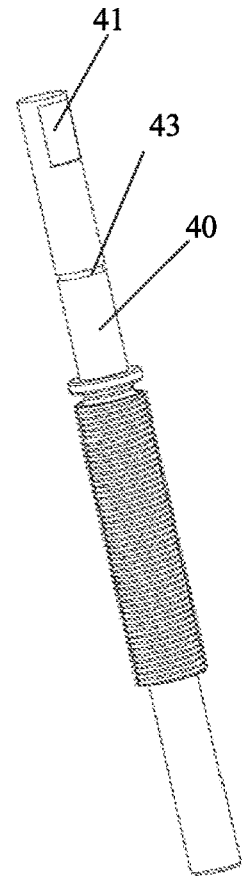
FIG. 4 is a schematic structural diagram of a valve core in the hydraulic system micro-adjustment device according to the present invention
Figure 5:
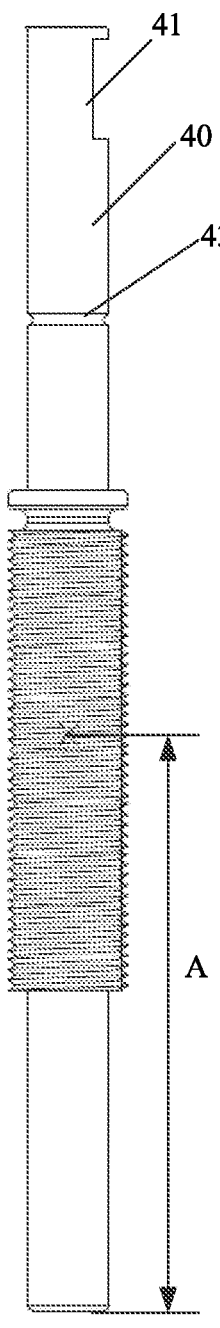
FIG. 5 is a front view of the valve core in the hydraulic system micro-adjustment device according to the present invention.
Figure 6:
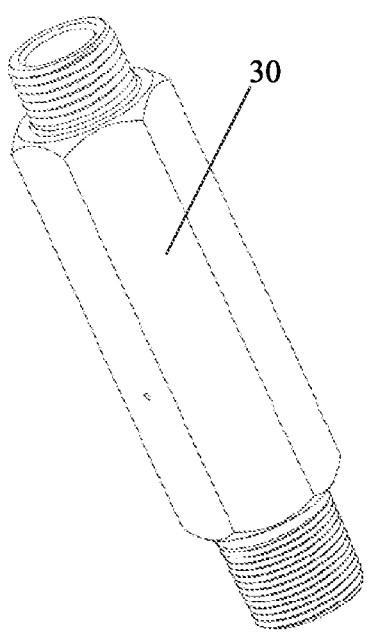
FIG. 6 is a perspective view of a valve body in the hydraulic system micro-adjustment device according to the present invention.
Figure 7:
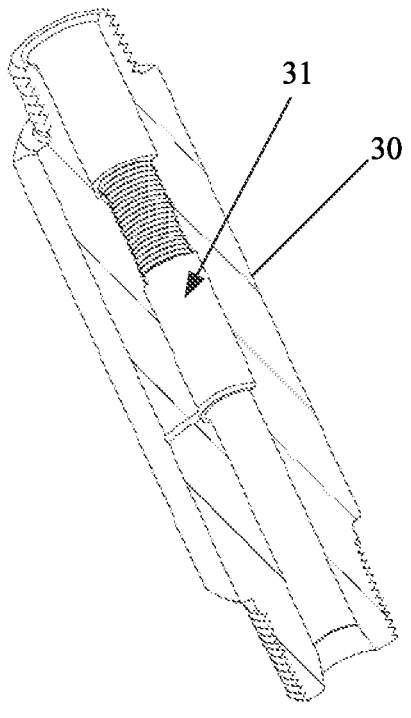
FIG. 7 is a schematic diagram of the internal structure of the valve body in the hydraulic system micro-adjustment device according to the present invention.
Figure 8:
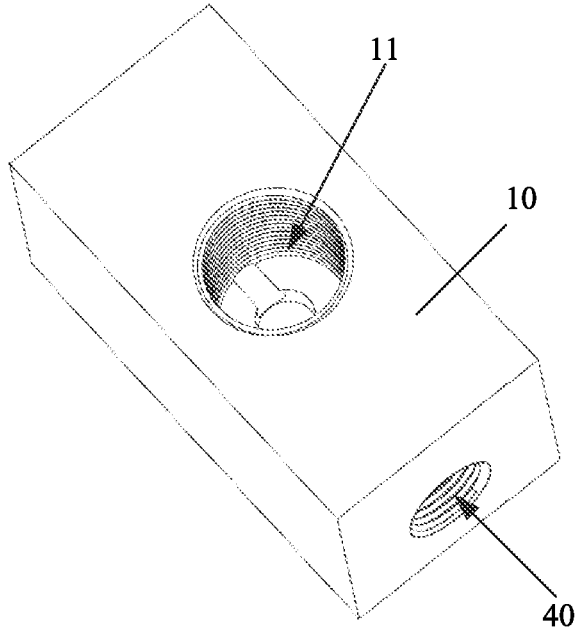
FIG. 8 is a schematic structural diagram of a base in the hydraulic system micro-adjustment device according to the present invention.
Figure 9:
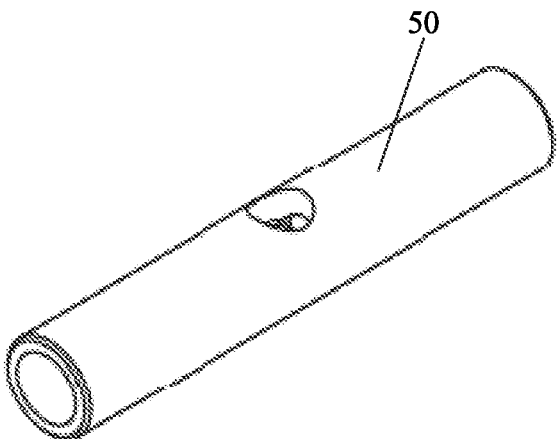
FIG. 9 is a schematic structural diagram of a handle in the hydraulic system micro-adjustment device according to the present invention.
Figure 10:
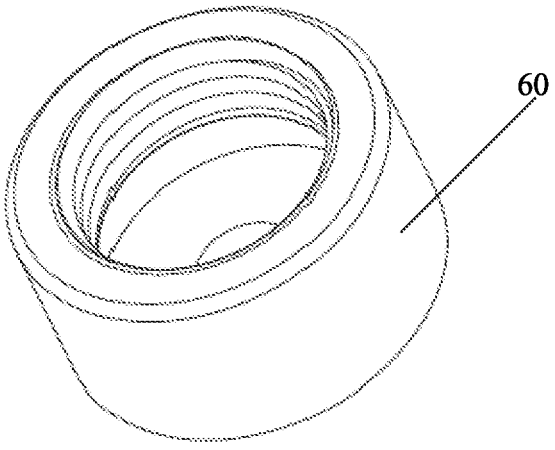
FIG. 10 is a schematic structural diagram of a top cover in the hydraulic system micro-adjustment device according to the present invention.

As shown in FIGS. 1 and 3, a surface of the piston 20 is provided with a first groove 21, and a sealing ring 22 and a sealing ring stop collar 23 are mounted in the first groove 21. The surface of the piston 20 is further provided with a guide groove 24, and a guide ring 25 is mounted in the guide groove 24. The bottom of the piston 20 is configured as a needle-shaped structure, which can ensure that the oil passages 12 are always open passages on left and right sides.

After the guide ring 25 is mounted in the guide groove 24, the friction between the piston 20 and the valve body 30 can be prevented. The design of the relatively wide guide ring 25 ensures that the axis of the piston 20 coincides with the valve body 30, which ensures that the sealing ring 22 (e.g., the O-ring) is evenly stressed to prevent squeezing from one side, thereby prolonging the service life of the O-ring.

Preferably, the guide ring 25 may be made of a polymer material. The valve body 30, the base 10, the piston 20 and the valve core 40 are made of nickel-base alloy stainless steel.

In the present application, in the hydraulic system micro-adjustment device, high-strength nickel-base alloy stainless steel is preferably used as the material of the valve body 30, the base 10, the piston 20 and a screw. The excellent wear resistance and anti-seize properties of the high-strength stainless steel allow the valve body to still achieve a long service life under high pressure. The screw made of stainless steel after heat treatment can provide high-strength yield strength and reliable service life. The guide ring 25 is made of a polymer material, which has the characteristics of high hardness and low friction coefficient to provide reliable support for the piston and can prevent direct contact between the piston 20 and the valve body 30.

The present invention further provides a tank calibration system comprising the hydraulic system micro-adjustment device as described above.

Based on the above structural description, a mounting process for the hydraulic system micro-adjustment device according to the present invention is as follows. The sealing ring 22, the sealing ring stop collar 23 and the guide ring 25 are mounted on the piston 20, the piston 20 is inserted into the valve body 30 from the bottom, the valve core 40 is inserted into the valve body 30 from the top of the valve body 30, then the valve body 30 is screwed into the base 10, the top cover 60 is mounted on the valve body 30, and the handle 50 is mounted on the valve core 40 by means of the set screw 42. Finally, a quick connector can be directly mounted on the base 10 via the pipe thread of the base 10, and then the base is connected to a hydraulic system via the quick connector.

During operation, after the product is mounted between a hydraulic pump and an oil cylinder, the handle 50 of the hydraulic system micro-adjustment device according to the present application is first rotated until the circular ring 43 of the valve core 40 is just exposed from the top cover 60, and after pressurizing to about a pre-set pressure and waiting for reaching stable pressure, the handle 50 is rotated to obtain an ideal pressure.

If there is no hydraulic system micro-adjustment device according to the present application, the pressure can only be adjusted by the hydraulic pump, and once the pressure exceeds an ideal value, the ideal value can only be achieved by completely relieving pressure and pressurizing again. Under high pressure, it is difficult to achieve linear fine adjustment within a certain pressure range, and there is usually a problem that the ideal pressure cannot be reached and will be exceeded once the pressurization is performed. With the use of the hydraulic system micro-adjustment device according to the present application, the pressure can be first increased to about the ideal value, and then reach the ideal pressure value by means of the hydraulic system micro-adjustment device, which avoids pressurization for many times to save a lot of time.

For the hydraulic system micro-adjustment device according to the present invention, after waiting for the liquid flow inside the hydraulic system to tend to be stable, by means of adjusting the volume of the cavity inside the valve, the volume of the hydraulic oil can be changed under the condition that the mass of the hydraulic oil remains unchanged, so that the pressure adjustment within a certain local range can be achieved on the basis of the original pressure, which provides more accurate control for the hydraulic calibration method of a weighing apparatus. In a hydraulic weighing system for a tank, when the pressure is greater than 50 bar, the hydraulic system micro-adjustment device can provide an adjustment range of −150 kg to 250 kg.

The hydraulic system micro-adjustment device according to the present invention has the advantages as follows.

I. The pressure adjustment range is large (−150 kg to 250 kg), and the linear adjustment of pressure is implemented by means of rotating the handle to drive the valve core and the piston to move up and down.

II. The structure is reliable. With the separated design of the piston and the valve core, the arc design of the bottom of the valve core, and the design of the guide ring on the piston, it is possible to ensure that the most vulnerable piston is evenly stressed and only moves linearly, so as to avoid circumferential rotation and prevent damage to the moving face of the piston caused by rubbing of the piston against the valve body.

III. The accuracy is reliable. Fine threads are used as the threads on the valve core, so that micro-adjustment of the pressure can be implemented.

IV. The service life is reliable. Stainless steel with high wear resistance and high strength is used, has excellent corrosion resistance, and does not need additional maintenance. The combination of different grades of stainless steel eliminates the bonding between the valve body and the base and between the valve core and the valve body, thus providing high fatigue life.

In conclusion, with the hydraulic system micro-adjustment device and the tank calibration system comprising same according to the present invention, the adjustment of pressure in a local range can be achieved, thereby reducing the number of times of pressurization to improve the calibration efficiency. The target pressure value can be reached quickly and stably, thereby reducing uncertainty and improving the calibration accuracy.

In terms of function, the hydraulic system micro-adjustment device implements pressure adjustment by means of the cooperation of the base, the piston, the valve core and the valve body.

In terms of machinability, the components of the hydraulic system micro-adjustment device have a simple structure and are convenient to machine, and most of the components are cylindrical and can be machined by means of lathe work.

In terms of serviceability, the hydraulic system micro-adjustment device can be replaced with a polymer sealing member.

In terms of reliability, with the structure of the hydraulic system micro-adjustment device, the piston is evenly stressed, thus preventing the damage to a moving face of the piston. The combination of different grades of stainless steel eliminates the bonding between the valve body and the base and between the valve core and the valve body, thus providing high fatigue life.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST

Base 10
Piston 20
Valve body 30
Valve core 40
Handle 50
Inner cavity 31
Top cover 60
Mounting hole 11

Oil passage 12
Flat face 41
Set screw 42
Circular ring 43
Distance A
First groove 21
Sealing ring 22
Sealing ring stop collar 23
Guide groove 24
Guide ring 25

The invention claimed is:

1. A hydraulic system micro-adjustment device for a tank calibration system, the hydraulic system micro-adjustment device comprising:

a base;

a piston;

a valve body;

a valve core; and a handle;

wherein the valve body is internally provided with an inner cavity for receiving the valve core from an upper portion of the valve body;

wherein the valve core is in threaded connection with the inner cavity;

wherein the piston is inserted into the inner cavity from a lower portion of the valve body, and the piston abuts against the valve core;

wherein the lower portion of the valve body is mounted in the base and is in communication with oil passages in the base, and the handle is connected to a top of the valve core;

wherein the valve core is movable along the inner cavity upon rotation of the handle, thereby pushing the piston to move along the inner cavity so as to change a volume of a cavity formed by the base, the valve body, and the piston;

wherein an upper portion of the base is provided with a mounting hole, two side portions of the base are respectively provided with an oil passage, which are in communication with the mounting hole, and the lower portion of the valve body is mounted in the mounting hole; and wherein the volume of the cavity formed by the base, the valve body, and the piston is a first volume when the valve core is screwed to reach a highest point, and the volume of the cavity formed by the base, the valve body, and the piston is a second volume when the valve core is screwed to reach a lowest point, the first volume being twice the second volume.

2. The hydraulic system micro-adjustment device of claim 1, wherein:

an upper portion of the inner cavity of the valve body is provided with threads, and a middle portion of the valve core is provided with threads, such that the valve core is in threaded connection with the upper portion of the inner cavity; and a lower portion of the inner cavity is a through hole, in which the piston is inserted.

3. The hydraulic system micro-adjustment device of claim 2, wherein a bottom of the valve core has a circular arc structure, the bottom of the valve being a distance from a central point of the threads of the valve core.

4. The hydraulic system micro-adjustment device of claim 1, wherein a lower portion of the valve core is a polished rod.

5. The hydraulic system micro-adjustment device of claim 1, wherein an upper portion of the valve core is provided with a circular ring that indicates position of the valve core.

6. The hydraulic system micro-adjustment device of claim 1, wherein a surface of the piston is provided with a first groove, in which a sealing ring and a sealing ring stop collar are mounted.

7. The hydraulic system micro-adjustment device of claim 6, wherein the surface of the piston is provided with a guide groove, in which a guide ring is mounted.

8. The hydraulic system micro-adjustment device of claim 7, wherein the guide ring is made of a polymer material.

9. The hydraulic system micro-adjustment device of claim 1, wherein a bottom of the piston is configured as a needle-shaped structure.

10. The hydraulic system micro-adjustment device of claim 1, wherein the valve body, the base, the piston, and the valve core are made of nickel-base alloy stainless steel.

11. The hydraulic system micro-adjustment device of claim 1, wherein the hydraulic system micro-adjustment device further comprises a top cover that is sleeved over the upper portion of the valve core and is connected and fixed to an upper end portion of the valve body.

12. A tank calibration system comprising the hydraulic system micro-adjustment device of claim 1.

* * * * *